United States Patent [19]

Koss et al.

[11] 4,403,814
[45] Sep. 13, 1983

[54] METHOD FOR LOCKING AN ANTI-FRICTION BEARING TO A SHAFT AND APPARATUS FOR ACCOMPLISHING THE SAME

[75] Inventors: William H. Koss, Waukesha, Wis.; Richard J. Smith, Valparaiso, Ind.

[73] Assignee: McGill Manufacturing Company, Inc., Valparaiso, Ind.

[21] Appl. No.: 342,129

[22] Filed: Jan. 25, 1982

[51] Int. Cl.³ .............................................. F16C 35/06
[52] U.S. Cl. ................................................ 308/236
[58] Field of Search .............. 308/236, 189 R, 189 A, 308/216, 207 R, 207 A; 29/148.4 A; 403/362

[56] References Cited

U.S. PATENT DOCUMENTS

| | | | |
|---|---|---|---|
| 696,777 | 3/1902 | Ward | 308/236 X |
| 1,561,443 | 11/1925 | Searles | 308/236 X |
| 2,136,819 | 11/1938 | Large | 308/236 |
| 3,276,828 | 10/1966 | Mansfield | 308/236 |
| 3,301,614 | 1/1967 | Haentjens | 308/236 X |
| 3,304,140 | 2/1967 | Hornigold | 308/236 |
| 3,588,208 | 6/1971 | Kane | 308/236 |
| 3,740,085 | 6/1973 | Evans | 403/362 |
| 3,797,901 | 3/1974 | Smith | 308/236 |

OTHER PUBLICATIONS

The Fafnir Bearing Co. Catalog 68 (1967)—Cover, pp. 143–164.

The Fafnir Bearing Co., Division of Textron Catalog (Form No. 551—Second Edition).

Primary Examiner—Stuart S. Levy
Assistant Examiner—David J. Werner
Attorney, Agent, or Firm—Foorman L. Mueller

[57] ABSTRACT

The method of locking a shaft within a bearing so that they are concentrically positioned against rotational and axial relative movement, and an apparatus for practicing such method comprising a complete assembly such as a pillow block bearing which includes an axial extension on the inner race ring of the bearing of a lesser outside diameter than the outside diameter of the main body portion of such inner race ring, with slots spaced equally around the circumference of such extension cut axially inwardly from the outer edge to provide multiple segments therein. A continuous circular collar positioned over the extension includes two threadably mounted set screws spaced apart within an arc substantially 30° to 60° on the continuous circular collar, and in such position of the collar on the extension each set screw is over a segment and the segments are separated by an extension slot. The set screws are tightened in the collar so that each impinges on a corresponding portion of the segmented extension to move such portion into locking engagement with a shaft within the inner race ring. Coincidentally the continuous collar pulls the remaining portion of the segmented extension into engagement with the shaft on the opposite side to that wherein the set screws are positioned.

7 Claims, 3 Drawing Figures

METHOD FOR LOCKING AN ANTI-FRICTION BEARING TO A SHAFT AND APPARATUS FOR ACCOMPLISHING THE SAME

The bearing industry has been concerned with an age-old problem of locking together an anti-friction bearing and the shaft therein so that there is no relative movement between the inner race ring of the bearing on such shaft for a maximum period of time. The present invention relates generally to a method of accomplishing such locking and an anti-friction bearing such as a pillow block type as the apparatus to be locked to a shaft. It has been found to provide improved holding power for a longer period of time than could be obtained with prior structures and the methods of using the same, and avoids burring of the shaft.

The bearing as the apparatus for practicing the present invention comprises an outer race ring and an inner race ring to be concentrically positioned on a shaft, and more particularly to such a method and apparatus wherein a bearing with an extension axially on the inner race ring with axial slots extending inwardly from the outer edge of such extension and equally spaced apart circumferentially therein provides a segmented portion of said inner race ring. A continuous collar is positioned around said extension, and spaced apart set screws threadably mounted in such collar are each tightened in a radial direction to engage a corresponding segment of such extension. As the set screws are tightened in the collar, one part of said complete extension is moved by said set screws into engagement with the shaft. The collar is then in contact with said extension at that one part and simultaneously the collar pulls the opposite part of the segmented extension into an engaging concentric position with such shaft. In such position both such parts and the entire segmented extension concentrically engage such shaft and lock the inner race ring, and hence the bearing, securely against axial and relative rotational movement on said shaft.

The Smith U.S. Pat. No. 3,797,901 which issued Mar. 19, 1974, and is owned by the assignee of the present application, is related to the present invention in the sense that the set screw locking structure from the Smith patent is utilized in the present invention, and the disclosure thereof by reference is incorporated herein. The two set screws in the Smith invention directly engage a shaft in the inner race ring of the bearing and cause burrs on the shaft which can represent a problem when separating the bearing and the shaft for replacing one or the other. Prior art structures have been used which lock a bearing onto a shaft by set screws threadably carried in threaded holes in continuous rigid ring collars positioned on a segmented extension of the inner race ring of the bearing so as to avoid such burring. The prior art also includes hose-clamp-like non-continuous collars with a threaded bolt in holes at each end of such non-continuous collars to pull the two ends together and thereby clamp the inner race ring on a shaft. This avoids burring on the shaft.

Representative of the first type discussed above is the Large U.S. Pat. No. 2,136,819 issued Nov. 15, 1938, comprising an axial extension on the inner race ring of the bearing made up of "overhanging fingers 26 which are yieldable with respect to the body of the race ring." Each such finger is formed by a slot 22 intersected by an axial slot 24, and each finger is yieldable when tightening a set screw in a threaded hole which actually straddles a slot 24 by engaging the axial extension material essentially at each edge of the slot. The threaded holes and set screws are in a continuous ring positioned on the axial extension. There are two such slots separated 180° on the extension, and each set screw is directed radially at a slot whereby the tightening of each screw is said to cause the yielding of such fingers and the engagement thereof in the race ring extension with the shaft.

The Fafnir Bearing Company of New Britain, Connecticut, in Catalog 68 copyrighted in 1967 illustrated and described a Clamp-Type Concentric Collar with a cam configuration on and between a split axial extension on an inner race ring and the collar. Two slots extend axially in the extension with a depression in the surface thereof, and it appears that after the assembly of the collar on the extension a set screw in the collar is positioned over the depression in the ring surface. When it is tightened to extend into the depression the race ring axial extension is anchored or locked to the shaft. Reproductions of what are reproductions of the cover of Catalog 68 and pages 143 and 164 thereof are included with the filing of this application.

Subsequently, when The Fafnir Bearing Company became a Division of Textron, an undated Catalog (Form No. 551-Second Edition) was distributed which shows a Clamp-Type Collar Bearing which is described in the reproduction of such catalog supplied with this application as comprising an axial extension with two segments defined by two axial slots. A single set screw is threadably tightened in a hole in the collar to lock the axial extension onto a shaft. The collar with the set screw and hole appears to be positioned so that the set screw is 90° in an arcuate spacing away from each slot, or halfway between such slots.

U.S. Pat. No. 3,588,208 issued June 28, 1971 to Thomas E. Kane, and was assigned to Tek Bearing Company of Bridgeport, Connecticut. It discloses a continuous locking collar on an axial extension of an inner race ring in a bearing that consists of three equally circumferentially spaced apart axially extending slots in such extension which in turn define three segments in the extension. A set screw is threadably carried in a hole in the collar which is positioned over one of the three segments halfway of the arc between two adjacent slots, and 180° from the third slot. Upon the tightening of the set screw on one segment the three segments are said to engage and be locked to the shaft on which the bearing is mounted.

Another structure for bearings and shafts which avoids burring on the shaft and does not employ set screws is that marketed under the trademark SKWE-ZLOC by Borg Warner Company, and is related to the structure of Mansfield U.S. Pat. No. 3,276,828 issued Oct. 4, 1966. This employs a split or non-continuous collar positioned around a segmented extension of the inner race ring of such a bearing with the collar having a head on each end at the split. A plain bore in one head of the split ring accommodates a bolt, and a threaded bore in the other head of the split collar receives the threads of the bolt. This plain bore and threaded bore are such that the bolt extends into the two bores at right angles to the axis to the shaft and the axis line of the bearing on the shaft. The collar operates in the normal manner of a hose clamp, and tightening the bolt draws the split or non-continuous collar around the segmented extension of the inner race ring.

A hose-clamp type structure is also disclosed in U.S. Pat. No. 3,304,140 to C. W. Hornigold which issued Feb. 14, 1967. The ring is non-continuous and is pulled together with a bolt at right angles to the axis of the shaft within the bearing by the same general structure as in Mansfield U.S. Pat. No. 3,276,828.

With all of this patent and commercially used prior art, there were still problems in the art with respect to the adequacy of the holding power for the locking device for a bearing on a shaft, and comparative results from dynamic and axial static tests performed with prior art structures and the structure of the present invention show surprising and unexpected improvements in accomplishing the desired holding power by the method and structure of the present invention.

BACKGROUND OF THE INVENTION

The prior art noted above goes back at least to the 1938 issuance of the patent noted herein, and over a longer period that the shafts and the inner race ring of anti-friction bearings have been assembled with the inner race ring of such a bearing locked on the shaft so that the shaft and inner race ring could rotate within a fixed outer race ring. Constructions as described above have been accepted and used widespread in the bearing industry, but because of the importance of locking a shaft and an inner race ring of a bearing together the problem has been extensively attacked in the industry in many different ways not only by the prior construction referred to, but by many different structures than those discussed above. The cost of such structures, a lack of ultimate concentricity in many between the shaft and the inner race ring, and other problems dictated a continued need for an improved locking mechanism.

SUMMARY OF THE INVENTION

The method and apparatus of the present invention as generally described above and as will be more specifically described hereinafter has demonstrated an improvement in comparative axial static tests with the Fafnir clamp lock design of the catalog referred to of 539%. In a corresponding circumferential static test the improvement factor for the present invention over such Fafnir clamp lock was 695%. The mechanism marketed under the trademark SKWEZLOC and coming within the Mansfield U.S. Pat. No. 3,276,828 was also treated with the device of the present invention, and the axial static tests showed an improvement on the average for the present invention of greater than 90%, while the circumferential static test showed that the results with the present invention were more than 60% better.

The above static test results have also been correlated with actual inner race to shaft holding power in a simulated commercial application and for this dynamic test, the present invention attained an average of 4,740,000 revolutions before loosening on the shaft. Under the same conditions, a commercial unit marketed under the trademark SKWEZLOC and coming within Mansfield U.S. Pat. No. 3,276,828 attained 8,800 revolutions before loosening of the inner race on the shaft when exposed to identical loads and speeds. This indicates clearly for this comparision that the present invention locks the inner race of a bearing to a shaft under dynamic conditions in an improved fashion that is even more significant than the static test comparisons shown above.

Accordingly, the significant feature of the present invention is that it provides an overall improvement over such prior structures and the operation thereof which in turn constitutes an improvement over the life and effectiveness of a shaft locked in an anti-friction bearing as practiced by such prior art structures.

DETAILED DESCRIPTION OF INVENTION

Figure 1:
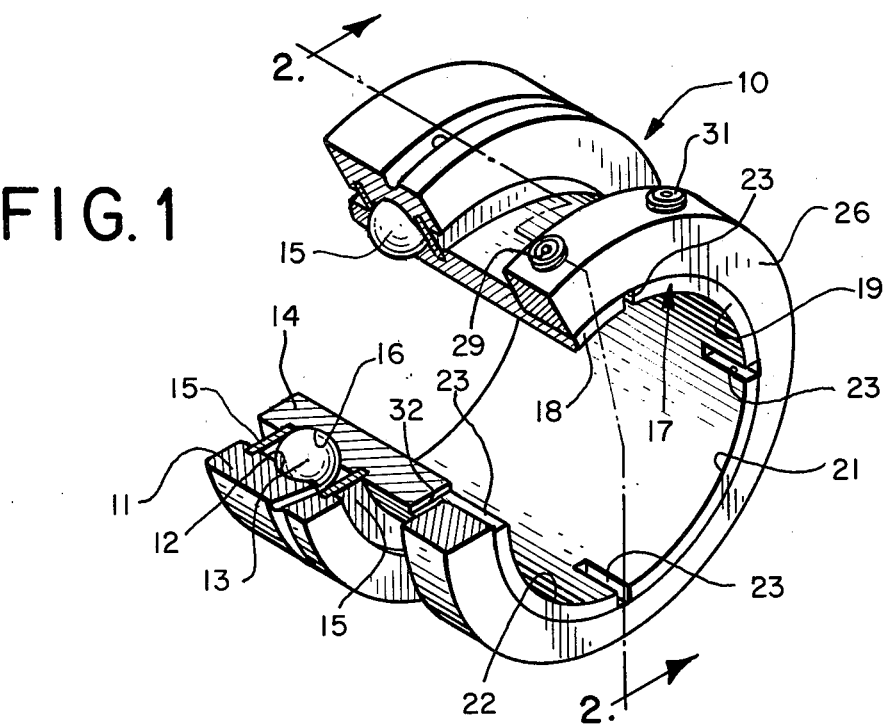
FIG. 1 is a perspective view of the complete bearing and locking device with a portion cut away to more completely show the cross-sectional and internal construction of the bearing.

The invention is represented in a method for locking a shaft and bearing together and an apparatus for practicing the method comprising a complete assembly which is actually a complete bearing structure 10. This comprises an outer race ring 11, a raceway 12, balls 13 and an inner race ring which is identified by the reference character 14 in FIG. 1. The inner race ring includes a raceway 16 and a segmented integral extension 17 with a lesser outside diameter (FIGS. 1 and 2 in particular) than the race ring portion having the raceway 16 therein. Yieldable seals 15 close the space between the outer and the inner race rings to keep lubricant in and dirt out.

Figure 2:
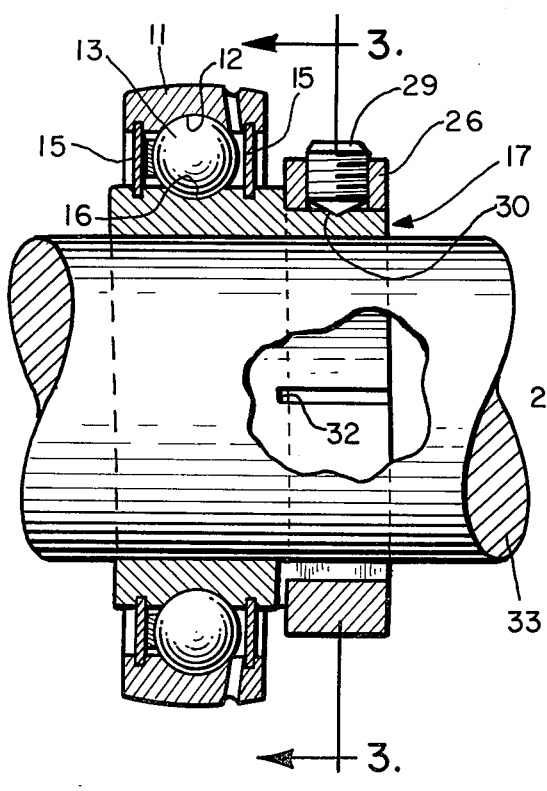
FIG. 2 is a sectional view along the line 2—2 of FIG. 1.

As shown in this preferred embodiment of the apparatus of the invention, there are four segments 18, 19, 21 and 22 spaced apart circumferentially in the integral extension of the inner race ring 14, and defined by corresponding slots 23 milled or sawed axially from the outside edge of the extension 17 inwardly a distance substantially equal to the width of a rigid continuous collar 26. Such continuous collar 26 is removable from the bearing but positioned over the segmented extension 17 when being used. The collar is substantially the width of that extension and the length of the slots 23 as shown in FIG. 2 when the bearing and shaft are assembled together. When the inner ring 14 and a shaft upon which it is mounted are so locked, the shaft is rigidly and securely maintained in position relative to the bearing.

Some dimensions for a representative bearing are 3.5433 inches as the O.D. for the outer ring 11, 2.479 inches as the O.D. for the inner ring 14, and 1.9375 inches as the bore diameter for such inner ring. The bore diameter for the collar 26 is 2.250 inches, and the O.D. for such collar is 2.875 inches. Accordingly, for that representative bearing to be locked to a shaft 1.9375 inches in diameter, the segmented extension in a relaxed position on the shaft is substantially 0.3125 inch in radial dimension.

Figure 3:
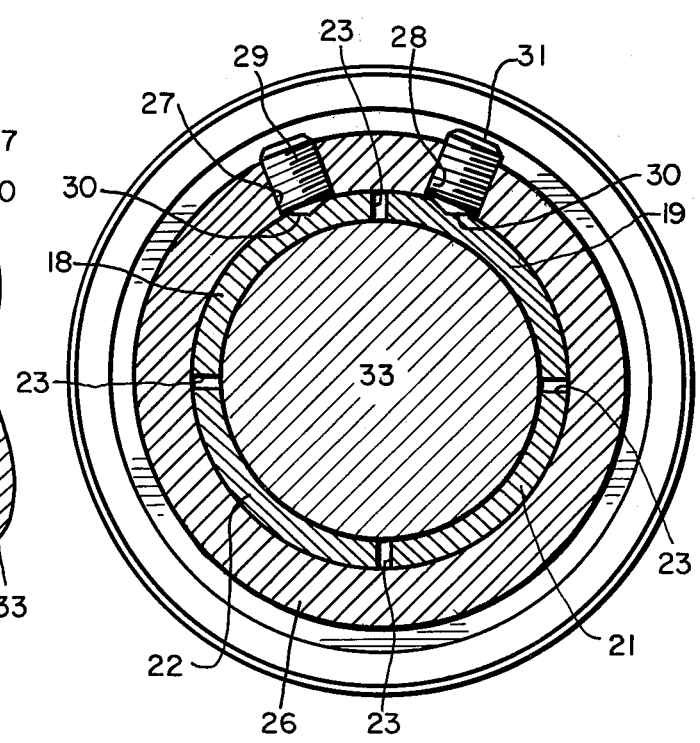
FIG. 3 is a side and cross-sectional view of such bearing assembly along the line 3—3 of FIG. 2.

In FIG. 1 the structure of the continuous ring 26 is shown as cut or broken, but as it is shown in FIG. 3 it completely encircles the inner ring extension 17 and is positioned at the outer axial portion of such extension (FIG. 2). Two threaded holes 27 and 28 (FIG. 3) extend entirely through the collar 26 to threadably carry set screws 29 and 31 in position to be readily tightened onto the extension 17. With the collar 26 in position the set screws are respectively on each side of a slot 23 as shown in FIGS. 1 and 3. In the illustrations of the set screws 29 and 31 and threaded holes 27 and 28 in the collar 26 as shown in FIGS. 2 and 3, such set screws are shown in fully tightened or locked positions. An optional countersunk conical drill point 30 for each set screw is shown, each of which mates with the conical point of the related set screw and such points are merely provided to positively locate the set screws in position and the collar therewith so that each set screw is on a corresponding segment separated by a slot 23 of the inner race extension. These conical drill point locators are not necessary for a satisfactory functioning of the device, however, as noted above, and are optional to insure that the collar is positioned properly on the raceway extension.

Furthermore, while four slots 23 are shown defining the corresponding segments to provide the maximum locking experience in the use of the invention, the invention is not limited solely to this number of slots and a combination of a different number of slots would perform almost as well. Economics of manufacturing dictate that four slots are the most practical number to apply to the structure, however, for the band saw or hack saw making the cuts or slots as 23 does so two at a time and opposite to one another in the extension. The inner race 14 is then turned 90° and two more cuts 23 are made oppositely disposed from one another. As many as six or eight slots could be employed with equal efficiency, but at greater cost.

As described and illustrated in Smith U.S. Pat. No. 3,797,901, the two set screws are positioned within an arc between 30° and 60°, and in the present invention that arc is in the collar 26. The graph illustrated in FIG. 3 of that patent shows that the maximum holding power for the set screws occurs with them spaced apart in a 45° arc. In the present apparatus it has been found that the application of the force of the set screws 29 and 31 in such position in the collar 26 when the set screws engage the segments 18 and 19 respectively provides the maximum holding force between all four segments 18, 19, 21 and 22 and the shaft 33. However, improved holding between said segments and the shaft is still obtained in accordance with the curve in the graph of FIG. 3 of said Smith patent.

As shown in FIG. 2 in particular, each slot 23 extends a dimension from the outer edge corresponding to the width of the collar 26 and then to the central portion of the inner race ring 14 as indicated by the reference character 32 in FIG. 2. With the bearing 10 and the shaft 33 assembled together with the collar 26 in place as shown particularly in FIGS. 2 and 3, the set screws 29 and 31 are tightened inwardly in the usual manner. Coincidentally, the opposite portion of the collar 26 engaging the segments 21 and 22, as shown, will pull such segments toward the shaft as the set screws are tightened to the final position as in FIGS. 2 and 3 against the segments 18 and 19. In that position of the set screws, the segments 18 and 19 are pressed tightly against the shaft 33 and the segments 21 and 22 are pulled equally tightly against such shaft by the movement of the ring, and this action with the collar and set screws so placed positions the shaft concentrically within such four segments to be securedly held against rotational and axial movement relative to the race ring 14.

The radial dimension of the segmented extension of the inner race ring is illustrated in the representative device for which dimensions are given above by simply subtracting the inner bore diameter of the inner race ring 14 from the bore diameter of the collar 26. Generally, while first providing a requisite strengthh of the extension 17, the thinner the inner race ring at such extension the more pliable such slotted end of such extension and the more readily each segment is forced or pulled against the shaft 33.

We claim:

1. In an anti-friction bearing installation having a mountable bearing with an outer race and an inner race therein and said races being maintained in the bearing for relative rotation therebetween, and a shaft in said inner race; a method of removably securing together in said mountable bearing said inner race and said shaft against relative rotation therebetween; said method comprising:
   (a) encircling said shaft with an integral axial extension from said inner race having at least four axially extending slots in said extension defining at least four corresponding axially extending segments;
   (b) encircling said slots and said segments of said extension with a continuous rigid ring having a pair of threaded holes therein space apart circumferentially by an angle measured in a radial direction from the axial center of said bearing which subtends an arc within a limit of substantially 30° to 60°;
   (c) threadably tightening a set screw in each of said pair of threaded holes with said continuous ring positioned circumferentially and axially on said integral axial extension so that each said set screw radially engages a corresponding segment with an axially extending slot positioned between said two engaged segments substantially equidistant between the respective points of engagement between said set screws and said engaged segments; and
   (d) continuing to tighten each said set screw in engagement with a corresponding segment to move each said corresponding segment into a tight and secure engagement with a side of said shaft in the inner race, with said encircling continuous ring during said continued tightening of said set screws engaging and radially reacting against the opposite axially extending segments which have a slot therebetween to move said latter opposite segments into a tight and secure engagement with said shaft on the side thereof opposite to the first engaged shaft side, with said shaft then being secured in said axial extension of said inner race against axial and rotational movement relative to said inner race.

2. In the method of claim 1 wherein said moving of said axially extending segments centers the shaft therein for said tight and secure engagement therewith.

3. In the method of claim 1 wherein said pair of threaded holes for said set screws are spaced apart circumferentially within said arc an angle of substantially 45°.

4. In an anti-friction bearing having outer and inner race rings rotatable relative to one another, with said inner race ring having an axially slotted and correspondingly segmented axial extension integral therewith with at least four such slots and at least four intervening segments therein defined by said slots, the improvement comprising:
   (a) means for centering a shaft in said axial extension and securing such a shaft therein against axial and rotational movement with respect to such inner race and integral axial extension on said inner race, said means comprising:
   (b) a continuous ring collar around said integral axial extension having two set screws threadably maintained therein and spaced apart within an angle measured in a radial direction from an axial center of a shaft in said inner race which subtends an arc of substantially between 30° to 60°, with said ring collar being circumferentially positionable on said axial extension and with said two set screws being spaced apart therein so that when said collar is in position for securing a shaft and said axial extension together each said set screw is then over a corresponding segment, with such two segments being adjacent one another and having a slot between the same, and with each said set screw being spaced circumferentially away from said slot a substantially equal distance in opposite circumferential directions from one another;

(c) two radially extending threaded bores accommodating the respective two set screws in said collar, with each said set screw being tightenable into its threaded bore to engage its corresponding segment and move said segment into engagement with a side of a shaft when a shaft is positioned in said inner race while said collar engages two segments of said integral extension on the opposite side of said extension and shaft to move the latter two segments radially into engagement with said shaft on said opposite side, all said moved segments acting to position a shaft concentrically in said integral axial extension and to engage and secure such a shaft against axial and rotational movement relative to said inner race.

5. In an anti-friction bearing as defined in claim 4 wherein said angle at which said two set screws are spaced apart within said arc is substantially 45°.

6. In an anti-friction bearing assembly having an outer race ring and an inner race ring which are rotatable relative to one another with said inner race adapted to be locked onto a shaft to prevent axial and rotational movement between such inner race ring and a shaft in said inner race ring, and an integral axial extension for said inner race ring having at least four slots extending axially in said extension defining a corresponding number of segments, the improvement comprising a rigid continuous ring collar havng two threaded radially extending holes therein, each having a set screw therein with said two set screws being spaced apart from one another within an arc which is substantially between 30° to 60° on said ring collar, said ring collar being positionable on said integral axial extension circumferentially of all said segments with each said set screw over a circumferential segment for engagement with that segment, said set-screw-engaged segments being adjacent to one another but separated by a slot which is between the respective positions of said two set screws, with said two set screws each upon tightening thereof in its threaded hole respectively engaging a corresponding segment to move the same into engagement with a shaft in said inner race, and while said two set screws are being tightened said continuous ring collar acts on segments opposite said two set screw-engaged-segments to pull said opposite segments into engagement with said shaft, with said segments which are at least four in number being movable by said two set screws and said collar each in a radial direction to position a shaft concentrically in said inner race ring and integral extension to retain the same against axial and rotational movement relative to said inner race.

7. In an anti-friction bearing assembly as defined in claim 6 wherein said two threaded radially extending holes are spaced apart substantially 45° in said arc.

* * * * *